Figure 1:
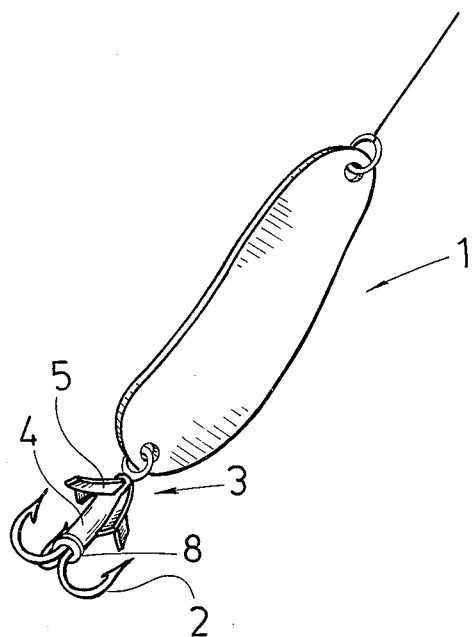

United States Patent [19]
Ruppa

[11] 3,964,202
[45] June 22, 1976

[54] FISHING LURE
[76] Inventor: Aaro Arvo Ruppa, Konhionkatu 75, Jyvaskyla, Finland
[22] Filed: May 20, 1975
[21] Appl. No.: 579,328

[52] U.S. Cl. ............................ 43/42.1; 43/42.2; 43/42.32; 43/42.38; 43/43.4
[51] Int. Cl.² .................................. A01K 83/00
[58] Field of Search .............. 43/42.1, 42.41, 43.2, 43/42.4, 42.2, 42.38

[56] References Cited
UNITED STATES PATENTS

| | | | |
|---|---|---|---|
| 539,149 | 5/1895 | Shattuck | 43/42.1 |
| 747,976 | 12/1903 | Junod | 43/42.2 |
| 1,116,025 | 11/1914 | Cripe | 43/42.2 |
| 1,758,344 | 5/1930 | Wright et al. | 43/42.2 |
| 2,589,435 | 3/1952 | Roeben | 43/42.1 |
| 3,020,668 | 2/1962 | O'Neil | 43/42.41 |

*Primary Examiner*—Warner H. Camp
*Attorney, Agent, or Firm*—Haseltine, Lake & Waters

[57] ABSTRACT

Improved fishing lure and hook means therefor, consisting of a fishhook stem with a loop on its end and of hooks extending therefrom in different directions, and means which protects the hooks against being caught on plants, stones and other equivalent obstacles. The protective means consists of a body part having an aperture admitting the passage of the stems and of elongated, elastic protective members attached by one end to said body part, and which project to the sides from the body part, in different directions, to be in front of the points of the hooks, constituting an elastic catching guard.

4 Claims, 4 Drawing Figures

U.S. Patent   June 22, 1976   3,964,202

FISHING LURE

Fishing lures and hook means of this type are quite commonly used in association with various types of fishing lures, such as throwing baits, trolling baits which are dragged behind a boat, hook and line fishing gear, etc. The number of hooks is usually three and they are phased at 120° around the axis constituted by the stem. The hook means is attached to the bait proper by the loop at one end of its stem. When a fishing lure provided with a hook means of this type is used for fishing, the hooks naturally have a great tendency to catch on plants, bottom stones and similar obstacles. Therefore, a great number of different protective means have been developed which prevent the hooks from fastening on obstacles of the kind mentioned. To this purpose upon the hooks there have been fitted protective arcs or springs, usually made of steel. However, summarizing the features of such hook means of prior art the observation can be made that they present numerous drawbacks.

It is an objectionable feature of the hook means that the protective means for the hooks is so inefficient that when the lure comes into contact with the bottom or with aqueous plants it is caught, owing to the inefficient protective means. A factor particularly contributing hereto is that the water constitutes a comparatively major flow resistance acting on the hooks, whereby the water-induced pressure pushes the protective means aside from its position covering the hooks and makes it ineffective. On the other hand the hook-protecting means may be far too efficient, in which case the protective means certainly prevents the hooks from catching on plants, stones and other equivalent obstacles, but at the same time it prevents the fish from being caught on the hooks. A major drawback of the hook means of existing art provided with a hook-protecting means is further that the protective means has been constructed to be integral with the lure proper, whereby their manufacturing costs are correspondingly higher, but the protective means cannot be moved from one lure to another.

The aim of the present invention is to eliminate these drawbacks. The hook means according to the invention is characterized in that the protective means consists of a body part with an aperture admitting the passage of the stem and, attached thereto each by one end, elongated and elastic protective members, which project to the side from the stem part in different directions to be in front of the pointed tips of the hooks, constituting an elastic catching guard.

It has been found that a protective means of this type, which is easy to manufacture in one piece of an elastic plastic material, constitutes an eminently usable catching guard for the hooks of the lure. In the hook means of the invention the elastic protective members need not be positioned upon the hooks: it suffices if the protective members are positioned in front of the points of the hooks. Hereby the protective means efficiently prevents the hooks from catching on plants, stones and other equivalent obstacles, but it presents no hindrance to the fish when it is caught on the hook. The protective means of the invention is furthermore eminently suitable to be affixed, as desired, to the hooks of any kind of fishing lure.

In an advantageous embodiment of the invention the protective members consist of vanes positioned at an oblique angle against the plane passing through the axis of the hook means, and the protective means is freely rotatable with reference to the hooks and to the stem.

The protective means will then be set into rotary motion about the stem of the hook means when the hook means is pulled through the water. The rotating protective means will then, at the same time, attract the fish to catch the lure. Moreover, the rotating protective means in its rotation constitutes an excellent catching guard with regard to plants, stones and other equivalent obstacles, but it does not prevent the fish from being caught on the hook.

In another advantageous embodiment of the invention the hook means comprises a washer, placed on the stem in such manner that the body part of the protective means rests against said washer.

The said washer will then prevent the body part of the protective means from being urged against the hooks and jamming there, and hereby it facilitates the rotation of the protective means.

Figure 2:
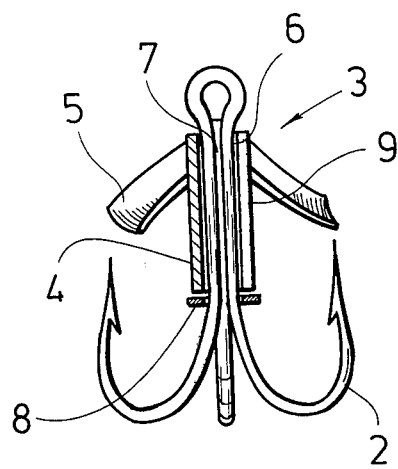
Figure 3:
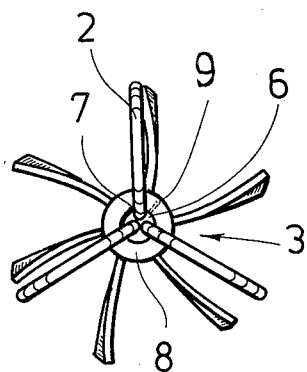
Figure 4:
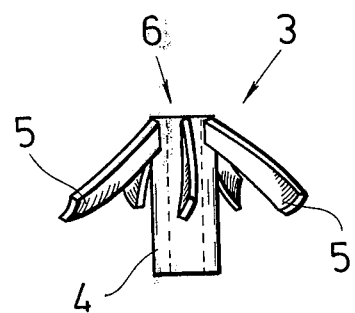

The invention is described in the following by the aid of examples, with reference to the attached drawing, wherein FIG. 1 presents a fishing lure fitted with a hook means according to the invention, FIG. 2 shows in an elevational view, and partly in section, a hook means according to the invention, FIG. 3 shows the same as FIG. 2, viewed in the direction of the hooks, and FIG. 4 shows protective means of a hook means according to the invention.

Referring now to FIG. 1, to a fishing lure 1 a hook means is attached, having three hooks 2, and a protective means 3 which protects the hooks from catching on plants, stones and other obstacles. The protective means 3 is composed of a sleeve-like body part 4 and of elongated and elastic protective members 5 attached by one end to the body part. The protective members 5 project to the side from the body part in different directions to be positioned in front of the points of the hooks 2, thereby constituting an elastic catching guard.

The body part 4 of the protective means 3 is elastically yielding in such manner that stems 7 of the hooks 2, with loops on their ends, can be easily introduced into the body part 4. The body part then rests with its lower end against a washer 8, and the protective means is therefore readily rotatable with reference to the hooks 2.

The protective members 5 preferably consist of propeller-like vanes, whereby a rotatory motion is imparted to the protective means 3 when a fishing lure provided with such a hook means is pulled through the water.

The protective means 3, shown in FIG. 4, is preferably made of elastic plastic material. The protective means may then be affixed to any kind of fishing lure to protect its hooks. The protective means of plastic may furthermore easily be made to be coloured, whereby the usability of the protective means and thus also of the hook means according to the invention is improved. It has been found that coloured, in particular red, protective means attract the fish to attack the hook, which implies an improvement of the usability of the hook means.

It is obvious to one skilled in the art that the invention is not confined to the examples presented above, but that it may vary within the scope of the invention as defined herein. For instance, the length of the body part 4 of the protective means 3 may be greatly variable, as may be also the shape and position of the protective members 5. The body part may also have a slit 9, through which the stems 7 of the hooks 2 are easily introducible into the body part without detaching the hooks from the lure.

Furthermore, the washer 8 may be made either to be loose or fixed with reference to the hooks 2, while on the other hand the washer is not indispensable in a hook means according to the invention.

I claim:

1. Improved fishing lure, comprising pointed hooks having stem portions and projecting in different directions; protective means which prevent said hooks from catching on plants, stones and other underwater obstacles; said protective means consisting of a body part having an aperture admitting the passage of said stem portions, and of elongated, elastic protective members attached by one end to said body part, and which members project from said body part in different directions to the sides thereof, in front of the points of said hooks, and constituting an elastic catching guard; wherein said protective members consist of vanes positioned at an oblique angle against a plane passing through the longitudinal axis of the fishing lure; said protective means being freely rotatable with reference to said stem portions; and wherein said body part has a slit therein, allowing said stem portions to be introduced into said body part, and constituting means for selectively attaching and detaching said protective means to and from the fishing lure without detaching said hooks.

2. The improved fishing lure as defined in claim 1, further comprising a washer placed on said stem portions in such manner that said body part rests against said washer.

3. The improved fishing lure as defined in claim 1, wherein said protective means is of an elastic plastic material.

4. The improved fishing lure as defined in claim 1, wherein said protective means is given a bright and conspicuous color.

* * * * *